3,076,026
PROCESS FOR THE SIMULTANEOUS PRODUCTION OF HYDROXYLAMINE AND ADIPIC ACID
Jesse Oris White, Orange, Tex., assignor to E. I. du Pont de Nemours and Company, Wilmington, Del., a corporation of Delaware
No Drawing. Filed Apr. 1, 1960, Ser. No. 19,178
5 Claims. (Cl. 260—531)

This invention is concerned with a process for the simultaneous production of hydroxylamine and adipic acid from a mixture of cyclohexanol and cyclohexanone, and, more particularly, this invention is concerned with a process for the production of hydroxylamine and adipic acid by the nitric acid oxidation of a mixture of cyclohexanol and cyclohexanone, obtained from the liquid phase, air oxidation of cyclohexane, to give adipomononitrolic acid, and the subsequent hydrolysis of this product in two steps to give adipic acid and hydroxylamine.

The conversion of cyclohexane into adipic acid by processes comprising liquid phase, air-oxidation of cyclohexane to a mixture comprising cyclohexanol and cyclohexanone followed by nitric acid oxidation of this mixture to give adipic acid is disclosed in United States Patents 2,439,513, issued April 13, 1948, and 2,557,282, issued June 19, 1951 to C. H. Hamblet and Ambrose McAlevy. Such processes have provided a commercially-valuable route to adipic acid an ingredient for the production of nylons (linear polycarboxylamides) by condensation polymerization with aliphatic diamines. The polymerization of adipic acid with hexamethylenediamine yields polyhexamethyleneadipamide, a widely-used nylon in both textile and plastic applications, which is manufactured on a scale of many millions of pounds per year. Therefore, routes to adipic acid which will be more economical and which will provide nylons at lower cost to meet ever-increasing competition are valuble process objectives. As carried out in processes such as those of Hamlet et al., the nitric acid oxidation step results in the reduction of vast quantities of $HNO_3$ to $N_2O$ and $N_2$ which must be destroyed as waste gases. This loss of nitrogen adds greatly to the cost of manufacture of the adipic acid.

Hydroxylamine is a valuable industrial chemical used as an intermediate in many manufacturing operations. As one example, it is used in the synthesis of ε-caprolactam. Hydroxylamine is reacted with cyclohexanone to give the oxime which is then converted by a Beckmann rearrangement to ε-caprolactam, the monomer employed for polymerization to polycaprolactam, which is manufactured on a large scale for fabrication to textiles and plastic articles. At the present time, hydroxylamine is prepared commercially either by the reaction of sodium nitrite with sodium bisulfite and $SO_2$ or by the rearrangement and hydrolysis of a nitroalkane. Both of these processes are expensive, and, as a consequence, hydroxylamine is a costly chemical intermediate. A process which will permit the conversion into hydroxylamine of the $HNO_3$ now lost, as $N_2$ and $N_2O$, in the nitric acid oxidation route to adipic acid will provide this valuable intermediate at a substantially lower manufacturing cost while at the same time reducing the cost of manufacture of adipic acid.

Therefore, it is an object of this invention to provide a process for the nitric acid oxidation of a mixture consisting essentially of cyclohexanol and cyclohexanone to yield adipic acid and hydroxylamine. It is another object of this invention to provide a process for the nitric acid oxidation of a mixture consisting essentially of cyclohexanol and cyclohexanone in which little or no $N_2O$ and $N_2$ are formed as byproducts. It is a further object to conduct the oxidation of a mixture of cyclohexanol and cyclohexanone with nitric acid in such a way that the only nitric acid consumed in the oxidation is reduced to hydroxylamine. It is a specific objective of the invention to provide a process for the hydrolysis of adipomononitrolic acid which will yield adipic acid and hydroxylamine and which will prevent the formation of $N_2$ and $N_2O$. Other objects and advantages of this invention will appear hereinafter.

It has now been discovered that the objects and advantages of this invention can be achieved by providing a process for the production of adipic acid and hydroxylamine which comprises: (1) oxidizing a mixture consisting essentially of cyclohexanol and cyclohexanone by treatment with aqueous nitric acid in the presence of $NO_2$, NO, $HNO_2$, or an alkyl or cycloalkylnitrite and separating solid adipomononitrolic acid from the aqueous reaction mixture, and oxidizing with oxygen the ntiric oxide in the aqueous solution to nitric acid for recycle; (2) reacting the adipomononitrolic acid with a hydrolyzing compound selected from the group consisting of anhydrous HCl, aqueous alkali metal hydroxides, aqueous ammonia, alkanols, and cycloalkanols to produce an adipomonohydroxamic acid compound (acid chloride, anhydride, or free acid) and a nitrite compound, and (3) hydrolyzing the adipomonohydroxamic acid compound to give adipic acid and a hydroxylamine salt, and separating the products by crystallization of the adipic acid.

It is believed that the reactions involved in the process of this invention can be described by the following chemical equations:

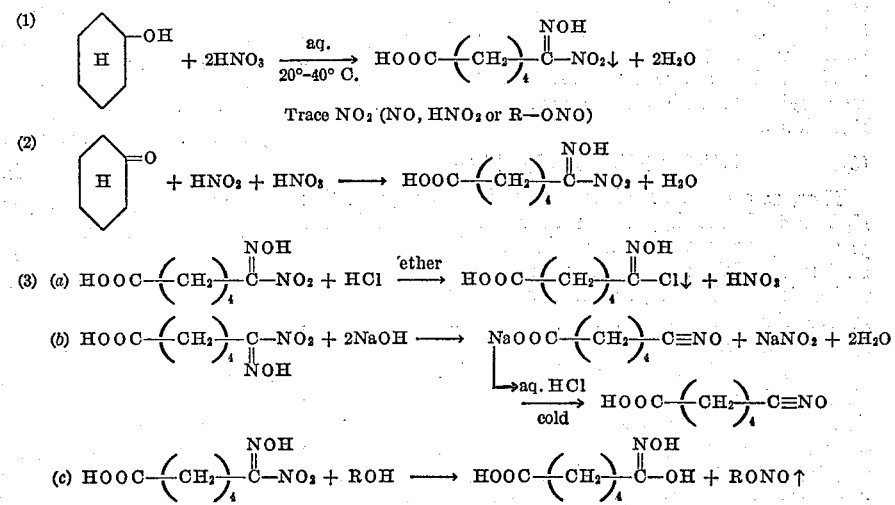

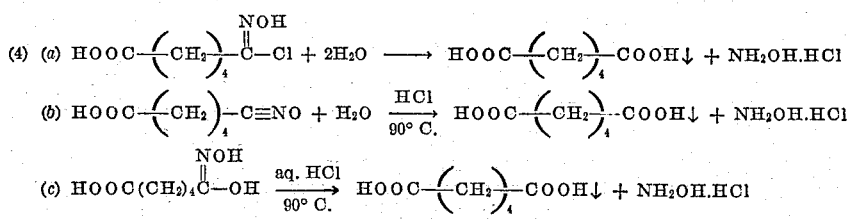

Equations 1 and 2 show the reactions involved in the first step of this process, the oxidation of a mixture consisting essentially of cyclohexanol and cyclohexanone with aqueous nitric acid to obtain adipomononitrolic acid. Aqueous nitric acid having a concentration ranging from 25% to 75% by weight $HNO_3$ can be employed. A trace of $NO_2$, NO, or $HNO_2$ is needed to start the reaction with cyclohexanol; approximately equimolar quantities of $NO_2$ (or NO or $HNO_2$) and cyclohexanone are required to obtain maximum yield in the oxidation of cyclohexanone (Equation 2). A low yield of adipomononitrolic acid is obtained from cyclohexanone without addition of $NO_2$ since some $NO_2$ arises under these conditions from side reactions. Instead of $NO_2$, an alkyl nitrite (e.g. cyclohexyl nitrite) can be employed. Likewise, instead of $NO_2$, NO or $HNO_2$ can be added to the aqueous nitric acid, since, as seen from Equations 5a and 5b (below) the presence of any one will automatically yield the other two:

(5a) 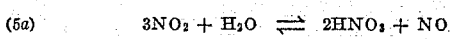

(5b) 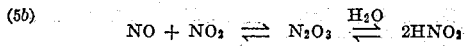

The nitric acid is added in excess of the theoretically-required amount. Generally, the proportion of nitric acid to cyclohexanol and cyclohexanone can be varied from about 2 to about 50 moles of $HNO_3$ per mole of the cyclohexanol and cyclohexanone. The nitric oxide formed as a byproduct is recovered by oxidation with air to $HNO_3$ and recycled. Adipic acid formed along with adipomononitrolic acid is recovered by crystallization in the final separation step.

The proportion of cyclohexanol and cyclohexanone employed for this oxidation can vary widely and is not critical. The mixture obtained by the liquid phase air-oxidation of cyclohexane is suitable. In this mixture, the proportions can vary from 30% to 70% cyclohexanol with a complementary proportion of cyclohexanone.

Equations 3a, 3b, and 3c show three alternative ways for carrying out the first step of the two-step hydrolysis of adipomononitrolic acid. This is a critical feature of the subject invention since it is this two-step hydrolysis which permits the recovery of hydroxylamine rather than the loss of nitrogen as $N_2$ or $N_2O$ as in processes for the preparation of adipic acid by nitric acid oxidation according to the prior art. It is essential that contact of the hydroxylamine with nitrous acid or $NO_2$ be avoided. Otherwise the hydroxylamine will be decomposed to $N_2$ or $N_2O$ and lost as waste gases. One typical reaction of hydroxylamine with nitrous acid can be indicated by Equation 6:

(6) $NH_2OH + HNO_2 \rightarrow N_2O + 2H_2O$

Thus, as a result of this invention, it now appears that $N_2O$ and $N_2$ are byproducts of a side reaction in the prior art processes for nitric acid oxidation of cyclohexanol and cyclohexanone. The process of this invention makes it possible to prevent this side reaction and to recover the otherwise lost nitrogen as a valuable product, hydroxylamine.

Equation 3a shows the partial hydrolysis of adipomononitrolic acid with anhydrous HCl. This reaction is carried out in an anhydrous solvent such as ethyl ether, dioxane, or benzene by passing anhydrous HCl gas into the solution of adipomononitrolic acid; the adipomonohydroxamic acid chloride product separates as a solid which, 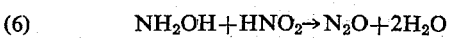 on dissolving in warm water (50°–100° C.) yields adipic acid and hydroxylamine hydrochloride, as indicated by Equation 4a. Adipic acid is separated from this solution by crystallization and recovered by filtration or centrifugation. The nitrous acid is recovered by oxidation with air to nitric acid and recycled. The hydroxylamine can be recovered as the hydrochloride by evaporation of the water. It can also be recovered by neutralization to a pH of 7–8 and extraction with ethyl ether. Alternatively, it may be recovered as an oxime by reaction with a ketone.

Equation 3b shows the partial hydrolysis of adipomononitrolic acid by warming at a temperature between about 50° and 80° C. with an aqueous alkali metal hydroxide (e.g. NaOH) to give the alkali salt of an anhydride of adipomonohydroxamic acid and alkali nitrite. Equally well aqueous ammonia ($NH_4OH$) can be employed as an alkaline hydrolyzing agent. Neutralization of this solution to a pH of 4–5 with a mineral acid, preferably HCl, causes an anhydride of adipomonohydroxamic acid to precipitate; the precipitate is then separated from the nitrite salt solution, by filtration or centrifugation, and hydrolyzed, as indicated by Equation 4b, by warming with a dilute aqueous mineral acid such as hydrochloric acid, sulfuric acid, or phosphoric acid, to yield adipic acid and the hydroxylamine salt; these products are separated as indicated above. If desired, solvent extraction and recrystallization can be employed to improve the separation of sodium nitrite from the hydroxamic acid anhydride.

Equation 3c shows a third route for the first step of the two-step hydrolysis of adipomononitrolic acid—reaction with an alkanol or cycloalkanol to yield adipomonohydroxamic acid plus an alkyl or cycloalkyl nitrite. While any common alkanol, such a methanol, ethanol, propanol, butanols, etc. can be employed, cyclohexanol is preferred since, as disclosed in a copending application, the nitrite obtained in this case, cyclohexylnitrite, can be recycled to the nitricacid axidation step and there oxidized, along with cyclohexanol and cyclohexanone, to give adipomononitrolic acid. When this step is employed in the process of the subject invention, the alkyl nitrite or cycloalkyl nitrite is separated by distillation from the reaction mixture, which then is further hydrolyzed, as indicated by Equation 4c and as disclosed above.

The process of this invention is further illustrated by the following examples of preferred procedures for carrying out the process. These examples are intended to be illustrative only and not to limit the process as disclosed above as variations within the scope of the invention would be obvious to those skilled in the art.

*Example 1*

Two-hundred and eighty-two grams of aqueous 67% nitric acid containing a trace of $NO_2$ was placed in a flask equipped with a dropping funnel, a stirrer, and a cooling jacket. Fifty grams of cyclohexanol was added slowly through the dropping funnel to the stirred nitric acid at such a rate that the temperature of the reaction mixture was held at 20° C. to 35° C., preferably in the range of 20°–25° C. After all of the cyclohexanol had been added, the mixture was cooled to 0° C., diluted with 150 cc. of ice water, and solid, yellow adipomononitrolic acid was separated by filtration, washed with cold water, and dried. The yield was 62 grams. This product had a melting point of 77–78° C.

Three grams of the solid adipomononitrolic acid was dissolved in 25 cc. of anhydrous ether and anhydrous HCl gas was passed into the solution at room temperature and pressure. The resulting adipomonohydroxamic acid chloride (3 grams) was separated by filtration and dissolved in 25 cc. of water and warmed to 75° C. Adipic acid was separated from the hydroxylamine hydrochloride by cooling the aqueous mixture to 25° C. and filtering the crystallized adipic acid; 2 grams of adipic acid was recovered. The hydroxylamine was recovered by neutralization of the aqueous mother liquor to a pH of 7 to 8 and extraction with ethyl ether.

*Example 2*

Two and one-half grams of adipomononitrolic acid and 1.7 grams of NaOH were dissolved in 25 cc. of water, and this solution was warmed to about 75° C. for 15 minutes. The resulting solution was cooled and carefully neutralized to a pH of 4–5 with aqueous 5% HCl acid. A precipitate was formed which was an anhydride of adipomonohydroxamic acid (often referred to as a nitrile oxide). This precipitate of adipomonohydroxamic acid anhydride was dissolved in 30 cc. of 4% HCl acid and warmed to 90° C. for 60 minutes. The cooled solution was analyzed and found to contain 1.5 grams of adipic acid and 0.35 gram of hydroxylamine.

*Example 3*

One part by weight of adipomononitrolic acid was dissolved in 10 parts by weight of cyclohexanol in a distillation flask and the solution was heated at 80° C. under 50 mm. pressure while distilling 0.65 part by weight of cyclohexyl nitrite from the reaction mixture along with some excess cyclohexanol. The residue in the distillation flask was then diluted with 14 parts of 5% HCl and heated under reflux for 30 minutes. On analysis, 0.76 part by weight of adipic acid and 0.12 part by weight of $NH_2OH$ were found. The adipic acid and hydroxylamine hydrochloride were separated by crystallization of the adipic acid.

The 0.65 part of cyclohexyl nitrite obtained above was mixed with 0.65 part by weight of cyclohexanone and 0.65 part by weight of cyclohexanol and the mixture added dropwise to 40 parts by weight of 67% nitric acid contained in a flask equipped with a dropping funnel, a stirrer, a cooling jacket, and an off-gas vent line. As the reaction proceeded, a mixture of NO and $NO_2$ was evolved and collected. This mixture of gases was combined with air to convert the NO to $NO_2$ and the $NO_2$ absorbed in water which converted it into nitric acid containing some $NO_2$, NO and $HNO_2$. The nitric acid was recycled to the oxidation step. The temperature of the reaction mixture during the oxidation was held in the range of 20°–35° C., preferably near 20° C. After all the mixture of cyclohexyl nitrite, cyclohexanone, and cyclohexanol had been added, the reaction mixture was sampled, cooled to 0° C., and diluted with 20 parts of water to precipitate the adipomononitrolic acid. The adipomononitrolic acid was recovered by filtration and washed with cold water. Analysis of the sample showed a yield of 1.92 parts by weight of adipomononitrolic acid. The adipomononitrolic acid was recycled to the first step of the process.

*Example 4*

0.727 gram of adipomononitrolic acid was dissolved in 20 cc. of cyclohexanol and the mixture slowly distilled at 80° C. and 50 mm. pressure. The distillation was continued until all the cyclohexylnitrite had been removed from the reaction mixture. Then 10 cc. of 5% aqueous HCl was added to the residue which then was heated at reflux for 30 minutes, cooled, and the crystallized adipic acid recovered by filtration (0.55 gram). The solution of hydroxylamine hydrochloride was then treated with a molar equivalent of cyclohexanone and the cyclohexanone oxime recovered by filtration.

*Example 5*

0.727 gram of adipomononitrolic acid was dissolved in 20 cc. of methanol and the mixture slowly distilled at 65° C. and 750 mm. pressure. The distillation was continued until all the methyl nitrite had been removed from the reaction mixture. Then 10 cc. of 5% aqueous HCl was added to the residue which then was heated at reflux for 30 minutes, cooled, and the crystallized adipic acid was recovered by filtration. The solution of hydroxylamine hydrochloride then was treated with a molar equivalent of acetone and the acetoxime recovered by extraction with petroleum ether.

I claim:

1. A process for the production of adipic acid and a hydroxylamine salt which comprises: (1) oxidizing a mixture consisting essentially of cyclohexanol and cyclohexanone by treatment with an excess of aqueous nitric acid having a concentration of $HNO_3$ in the range of 25% to 75% by weight, said aqueous nitric acid having dissolved therein a compound selected from the group consisting of $NO_2$, NO, $HNO_2$, and cyclohexylnitrite, said compound being present in the aqueous nitric acid in about equimolar proportion to the cyclohexanone, separating solid adipomononitrolic acid from the aqueous reaction mixture, and oxidizing with oxygen the nitric oxide in the aqueous solution to nitric acid for the recycle; (2) reacting the adipomononitrolic acid with a compound selected from the group consisting of anhydrous HCl, aqueous alkali metal hydroxides, aqueous ammonia, alkanols, and cycloalkanols to produce an adipomonohydroxamic acid compound selected from the group consisting of adipomonohydroxamic acid chloride, adipomonohydroxamic acid anhydride, and adipomonohydroxamic acid, and a nitrite compound selected from the group consisting of $HNO_2$, a nitrite, salt, an alkyl nitrite, and a cycloalkylnitrite; and (3) hydrolyzing the adipomonohydroxamic acid compound by heating in the presence of water and a mineral acid to yield adipic acid and a hydroxylamine salt, and separating the products by cooling to crystallize the adipic acid.

2. A process for the production of adipic acid and a hydroxylamine salt which comprises: (1) oxidizing a mixture consisting essentially of cyclohexanol and cyclohexanone by treatment with an excess of aqueous nitric acid having a concentration of $HNO_3$ in the range of 25% to 75% by weight, said aqueous nitric acid having dissolved therein a compound selected from the group consisting of $NO_2$, NO, $HNO_2$, and cyclohexylnitrite, said compound being present in the aqueous nitric acid in about equimolar proportions to the cyclohexanone, separating solid adipomononitrolic acid from the aqueous reaction mixture, and oxidizing with oxygen the nitric oxide in the aqueous solution to nitric acid for recycle; (2) reacting the adipomonitrolic acid with aqueous sodium hydroxide by warming the mixture at 50°–80° C., neutralizing the resulting solution to a pH of 4–5, and separating the resulting solid anhydride of adipomonohydroxamic acid from the aqueous solution of nitrous acid, and oxidizing with air the nitrous acid to nitric acid for recycle; and (3) hydrolyzing the anhydride of adipomonohydroxamic acid by warming with a dilute aqueous mineral acid selected from the group consisting of hydrochloric acid, sulfuric acid, and phosphoric acid, to yield adipic acid and a hydroxylamine salt, and separating the products by cooling to crystallize the adipic acid.

3. A process for the production of adipic acid and a hydroxylamine salt which comprises: (1) oxidizing a mixture consisting essentially of cyclohexanol and cyclohexanone by treatment with an excess of aqueous nitric acid having a concentration of $HNO_3$ in the range of 25% to 75% by weight, said aqueous nitric acid having dissolved therein cyclohexylnitrite in about equimolar proportion to the cyclohexanone at a temperature between 20° and 35° C., separating solid adipomononitrolic acid from the aqueous reaction mixture, and oxidizing with oxygen the nitric oxide in the aqueous solution to nitric acid for recycle; (2) reacting the adipomononitrolic acid with at least a molar equivalent of cyclohexanol to yield adipomonohydroxamic acid by heating the reactants together at a temperature between 50° and 100° C. while distilling off overhead a solution comprising cyclohexylnitrite and cyclohexanol and recycling the cyclohexylnitrite solution to the aforesaid oxidation step; and (3) hydrolyzing the adipomonohydroxamic acid by warming with a dilute aqueous mineral acid selected from the group consisting of hydrochloric acid, sulfuric acid, and phosphoric acid, to yield adipic acid and a hydroxylamine salt, and separating the products by cooling to crystallize the adipic acid.

4. A process for the production of adipic acid and hydroxylamine which comprises dissolving adipomononitrolic acid in an excess of an alcohol, selected from the group consisting of alkanols and cycloalkanols, and heating at a temperature between 50° and 100° C. while distilling off a solution of the alcohol nitrite and the alcohol, and hydrolyzing the adipomonohydroxamic acid in the residue by warming with a dilute aqueous mineral acid, selected from the group consisting of hydrochloric acid, sulfuric acid, and phosphoric acid, to yield adipic acid and a hydroxylamine salt, and separating the products by cooling to crystallize the adipic acid.

5. A process according to claim 4 in which the alcohol is cyclohexanol.

References Cited in the file of this patent

UNITED STATES PATENTS 2,789,136    O'Hara  ---------------- Apr. 16, 1957

OTHER REFERENCES

Sidgwick: "Organic Chemistry of Nitrogen," rewritten by Taylor et al., page 198 (1937).
Godt et al.: "Journal of the American Chemical Society," vol. 78, pages 1461–63 (1956).
Fieser et al.: "Organic Chemistry," page 131 (1950).
(Copies of above in Scientific Library.